(12) United States Patent
Levi

(10) Patent No.: US 8,511,525 B1
(45) Date of Patent: Aug. 20, 2013

(54) ROLLER GUIDE FOR VEHICLE ROOF MOUNTED LADDER RACK

(76) Inventor: Avraham Y. Levi, Eagan, MN (US)

( * ) Notice: Subject to any disclaimer, the term of this patent is extended or adjusted under 35 U.S.C. 154(b) by 3 days.

(21) Appl. No.: 13/366,627

(22) Filed: Feb. 6, 2012

(51) Int. Cl.
*B60R 9/042* (2006.01)

(52) U.S. Cl.
USPC .......................................... 224/310; 414/462

(58) Field of Classification Search
USPC .......................................... 224/310; 414/462
See application file for complete search history.

(56) References Cited

U.S. PATENT DOCUMENTS

| | | | | |
|---|---|---|---|---|
| 2,469,987 A | * | 5/1949 | Pilsner | 193/42 |
| 2,816,672 A | * | 12/1957 | Facchini | 414/534 |
| 3,826,390 A | * | 7/1974 | Watson | 414/462 |
| 3,888,398 A | * | 6/1975 | Payne | 224/310 |
| 4,390,117 A | * | 6/1983 | Fagan | 224/310 |
| 4,618,083 A | * | 10/1986 | Weger, Jr. | 224/324 |
| D306,414 S | * | 3/1990 | Godbersen | D12/106 |
| 5,297,912 A | | 3/1994 | Levi | |
| 5,469,933 A | * | 11/1995 | Thomason | 182/127 |
| D411,163 S | * | 6/1999 | Bunter | D12/414 |
| 5,951,231 A | * | 9/1999 | Allen | 414/462 |
| 5,957,350 A | * | 9/1999 | Giles | 224/310 |
| 6,092,972 A | | 7/2000 | Levi | |
| 6,427,889 B1 | | 8/2002 | Levi | |
| 6,467,662 B1 | * | 10/2002 | LaRochelle | 224/310 |
| 6,764,268 B2 | | 7/2004 | Levi | |
| 6,971,563 B2 | | 12/2005 | Levi | |
| 2011/0214944 A1 | | 9/2011 | Levi | |

* cited by examiner

*Primary Examiner* — Justin Larson
(74) *Attorney, Agent, or Firm* — Nikolai & Mersereau, P.A.; Thomas J. Nikolai

(57) ABSTRACT

A ladder rack incorporating one or more roller assemblies clamped or otherwise affixed to the side rails of the ladder rack that are made to serve as a fulcrum for facilitating the loading and unloading of ladders onto and from a roof rack mounted atop a cargo van or similar work vehicle.

3 Claims, 3 Drawing Sheets

ROLLER GUIDE FOR VEHICLE ROOF MOUNTED LADDER RACK

FIELD OF THE INVENTION

This invention relates generally to ladder racks for transporting one or more ladders on the roof of a work vehicle, and more particularly to an attachment to a ladder rack for facilitating the loading and unloading of ladders onto and from the roof mounted ladder rack.

DISCUSSION OF THE PRIOR ART

In my earlier U.S. patent application Ser. No. 12/719,573, filed Mar. 8, 2010, the contents of which are hereby incorporated by reference as if fully set forth herein, there is described constructional features of a commercially successful ladder rack for use on work vehicles, such as panel trucks and vans. FIG. 1 thereof is a perspective view of a ladder rack on which the present invention is adapted to be used. For convenience, that drawing is included herein as FIG. 1.

The ladder rack of FIG. 1 is seen to comprise a pair of parallel spaced-apart, longitudinally extending side rails 12, 14 and front and rear parallel, spaced-apart, transversely extending cross rails, 16, 18, respectively. The cross-rails 16, 18 are clamped or otherwise joined to the side rails, 12, 14.

To aid in lifting an extension ladder onto the ladder rack, the front ends of the side rails 10, 12 have attached thereto horn members 37, 39 that comprise tubing that has been formed into an arcuate curve so as to extend upwardly and outwardly relative to the side rails to which they are attached. In placing an extension ladder onto the cross members of the ladder rack, the workman will first lean the upper portion of a stringer of the ladder against the horn 37 or 39 with the lower end of the ladder's stringer resting on the ground so that the ladder is at an angle to the horizontal along the side of the vehicle. He will then lift the rear end of the ladder from the ground using the horn 37 or 39 as a fulcrum, until the involved ladder can clear the side rail 10 or 12 and made to lay flat on the cross rails 16, 18.

In removing a ladder from the roof rack, the procedure described is just reversed. The bottom end of a ladder's stringer is lowered to the ground at an angle to the vertical while the upper end portion thereof is cradled by the horn member.

While the inclusion of the horns 37, 39 on the front ends of the side rails offers a mechanical advantage when loading/unloading ladders from the roof rack, I have come up with an improvement that makes the operation easier for a person to perform.

SUMMARY OF THE INVENTION

In accordance with the present invention, the arcuate curved horn members are no longer used. Instead, I have attached spindles to one or both of the side rails at predetermined locations along the length dimension of the side rails where the spindles project upwardly and outwardly at the oblique angle to a longitudinal axis of the side rail on which the spindle is affixed. Journaled for rotation on the spindle is a cylindrical roller.

In use, when loading a ladder onto the roof mounted ladder rack, one stringer of the ladder is leaned at an angle against the upwardly and outwardly projecting roller with the bottom end of that stringer resting on the ground. Now, as the bottom end of the ladder is lifted, the stringer rides against the roller acting as a fulcrum. The location of the spindle and roller along the side rail can be adjusted to best suit the worker. Sliding friction is reduced to rolling friction.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
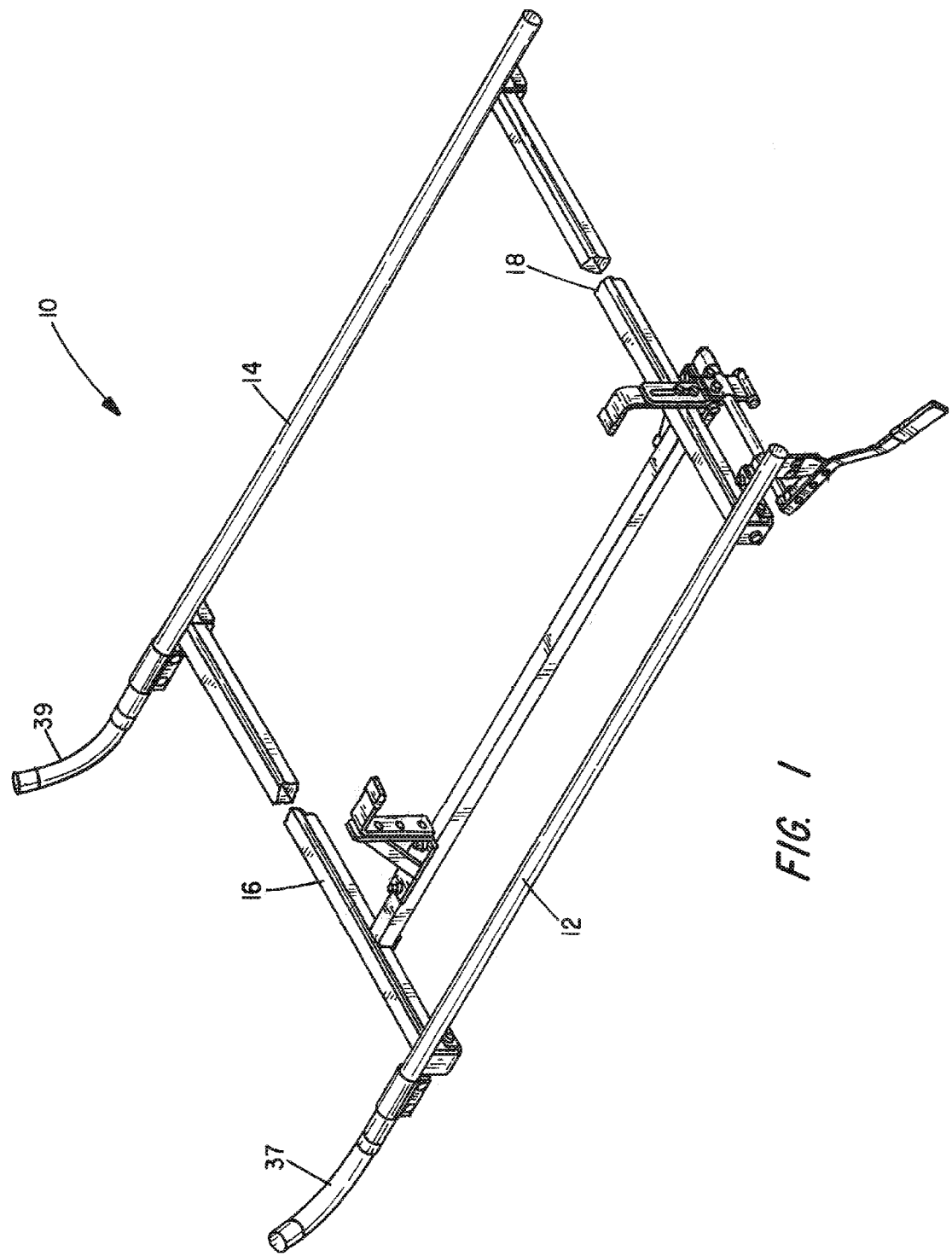
FIG. 1 is a drawing from my aforereferenced copending patent application.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Figure 2:
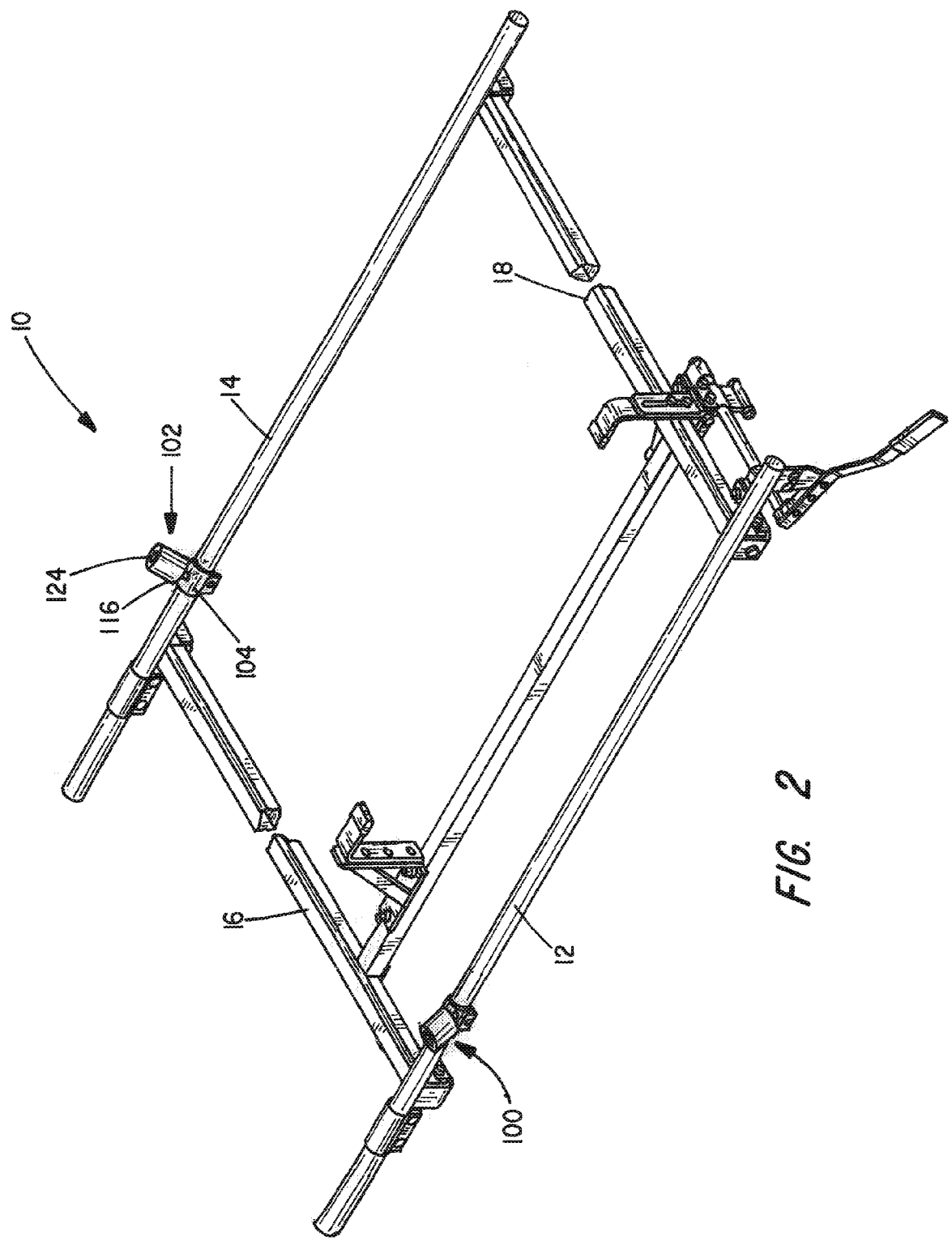
FIG. 2 is a perspective drawing showing the preferred embodiment of the present invention.

Referring to FIG. 2, instead of having the arcuate horns 37 and 39 illustrated in FIG. 1, there is affixed to the side rails 12 and 14 roller assemblies 100 and 102. More particularly, the roller assemblies 100 and 102 are clamped to the side rails 12, 14, respectively, and positioned at a location generally forward of the midpoint of the side rails and rearward of the front cross rail 16.

Figure 3:
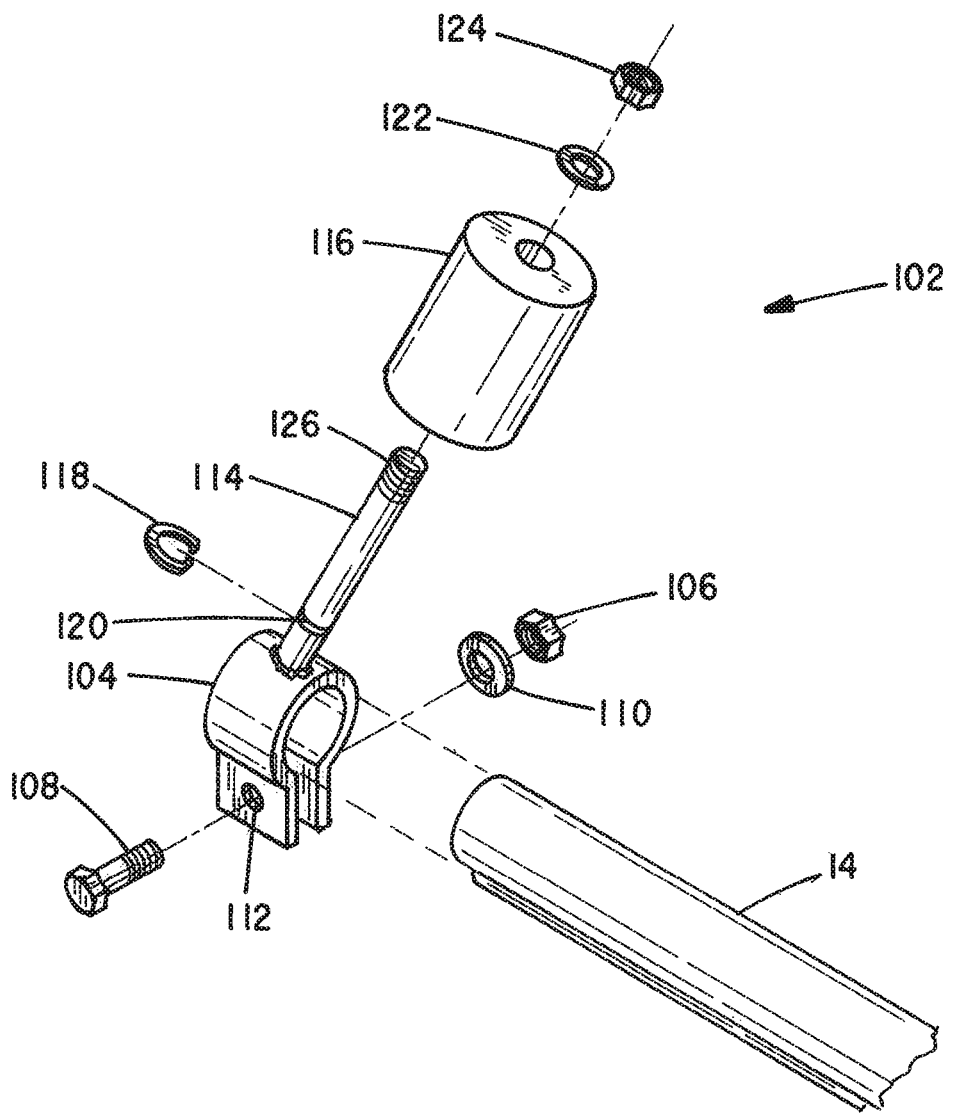
FIG. 3 is an exploded partial view of the preferred embodiment of FIG. 2.

FIG. 3 is an exploded view of the rollers assembly 102 affixed to the right side rail 14. The roller assembly is seen to include a U-shaped tube clamp 104 that is adapted to fit about the generally cylindrical side rail 14 and secured thereto by a nut, bolt and washer 106, 108 and 110, respectively, where the bolt 108 extends through aligned apertures 112 formed through the clamp 104.

Welded or otherwise affixed to the U-shaped clamp 104 is a cylindrical spindle 114 on which a roller 116 is journaled for rotation. Roller 116 is preferably a non-abrasive, rigid plastic, such as Nylon, and may be about 3 inches in diameter. A C-clip 118 cooperates with an annular groove 120 on the spindle 114 to maintain the roller 116 out of contact with the tube clamp 104. The roller 116 is held in place on the spindle 114 by a washer 122 and a nut 124 that cooperate with threads 126 on the spindle 114. Other fastening means such as a C-clip may also be used to hold the roller on its spindle.

As seen in FIG. 2, the side rail 12 has an identical roller assembly 100 mounted thereon.

In use, the ladder rack assembly 10 of FIG. 1 is typically mounted on the roof of a cargo van used to transport equipment including one or more ladders to a job site. Such cargo vans are typically about 7 ft. in height, presenting a challenge to loading and =loading ladders from a roof rack.

When unloading a ladder using the rack of the present invention, a worker will typically reach up and grasp a lower end portion of the ladder located near the rear of the vehicle and will lift it over the side rail such that one of the ladder's two stringers will be brought into contact with the roller 102 allowing the upper portion of the ladder to remain supported by the roller assembly 102 as the lower end thereof is brought into contact with the ground. At this point, the ladder will be oblique relative to the side rail. Now, the worker need only reposition himself proximate the midpoint of the ladder and lift it away carrying it to the worksite.

In reloading the ladder atop the vehicle, the worker will position the bottom of the ladder toward the rear of the vehicle and will tip the ladder until the top portion of the ladder's stringer is brought into engagement with the roller assembly 102, at which point he/she now lifts the rear end of the ladder and shifts it forward such that the stringer rolls along the surface of the roller 102 until the ladder is centered relative to the cross members 16 and 18 whereupon the ladder is shifted laterally onto the ladder rack.

It has been found that the employment of the roller assemblies 102 as a fulcrum point in place of the conventional curved tubular horns makes it significantly easier to load and unload ladders onto and from a cargo van's ladder rack.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. In a motor vehicle ladder rack having a pair of parallel, spaced-apart, longitudinally extending side rails and front and rear parallel, spaced-apart, transversely extending cross rails joined to the side rails, the ladder rack adapted to be affixed to the roof of the motor vehicle, the improvement comprising:

(a) a spindle affixed to one of the pair of side rails at a predetermined location along a length dimension thereof forward of a midpoint of said one of the pair of side rails and to the rear of the front cross rail, said spindle projecting upwardly and outwardly at an oblique angle to a longitudinal axis of the side rail on which the spindle is affixed in a direction outboard of the vehicle roof; and (b) a cylindrical roller journaled for rotation on said spindle the arrangement being such that the spindle mounted roller functions as a rest for a front end of a ladder stringer during manual loading and unloading of a ladder onto and from the ladder rack from a position alongside of the motor vehicle.

2. The motor vehicle ladder rack of claim 1 wherein the cylindrical roller is formed of non-abrasive, rigid plastic.

3. The motor vehicle ladder rack of claim 1 wherein the spindle mounted roller is adapted to cooperate with a stringer of a ladder as a guide and pivot point as a ladder is being loaded onto or unloaded from the vehicle ladder rack.

\* \* \* \* \*